United States Patent
Ogden et al.

[15] 3,680,943
[45] Aug. 1, 1972

[54] HOLOGRAPHIC IMAGING HAVING IMPROVED RESOLUTION AND INTENSITY BY SYNTHETICALLY ENLARGING THE APERTURE

[72] Inventors: George D. Ogden, Binghamton; Albert D. Tencza, Endwell, both of N.Y.

[73] Assignee: International Business Machines Corporation, Armonk, N.Y.

[22] Filed: Dec. 22, 1970

[21] Appl. No.: 100,735

[52] U.S. Cl. ........................... 350/3.5, 350/96 OT
[51] Int. Cl. .................................... G02b 27/00
[58] Field of Search .......................... 350/3.5, 96 T

[56] References Cited

UNITED STATES PATENTS 3,582,176   6/1971   Mathisen .................. 350/3.5
3,535,013   10/1970  Rosen ...................... 350/3.5
3,536,434   10/1970  Frank ...................... 350/96 T
3,580,655   5/1971   Leith et al. ............... 350/3.5
3,526,505   9/1970   Kroemer ................... 350/3.5

OTHER PUBLICATIONS

Sincerbox, IBM Technical Disclosure Bulletin, Vol. 10, No. 12, May 1968, pp. 1899– 1900.

*Primary Examiner*—John K. Corbin
*Assistant Examiner*—Ronald J. Stern
*Attorney*—Hanifin & Jancin and Kenneth P. Johnson

[57] ABSTRACT

Apparatus for constructing holograms in which reflective or refractive materials are used to recover normally lost object radiation to thereby produce higher spatial frequencies in the reconstructed image, enlarge the effective numeric aperture at relatively long object-to-hologram distances, and improve image resolution. Image intensity is also improved.

7 Claims, 6 Drawing Figures

INVENTORS
GEORGE D. OGDEN
ALBERT D. TENCZA

HOLOGRAPHIC IMAGING HAVING IMPROVED RESOLUTION AND INTENSITY BY SYNTHETICALLY ENLARGING THE APERTURE

BACKGROUND OF THE INVENTION

Holographic imaging offers significant benefits in certain applications because of its resolution capability and ability to readily reconstruct real images at desired locations. Attempts have been made to exploit these characteristics for the formation of printed circuits in particular. Non-contact exposure of photographic materials is especially attractive since the wear and replacement of exposure masks is eliminated. A further advantage with the Fresnel holograms made with a diffusion screen is that the hologram is not rendered useless if it becomes dusty or is slightly damaged, since the image is repetitively stored throughout the hologram.

A serious limitation is encountered in printed circuit applications, however, in the low energy transmission efficiency which necessitates long exposure of the photosensitive coatings. The development of lasers with greater power is a partial solution, but this is not an easy solution in the radiation wavelengths required for most photosensitive materials used for printed circuits. A more significant improvement in capability appears possible with better efficiency for energy transmission in the holographic system. A further difficulty is encountered as additional size reductions are attempted in miniaturized circuit chips. When the imaging resolution capability becomes inadequate, the image speckle and edge irregularities of poorly resolved images are a limiting factor in the formation of circuit lines and components.

It is accordingly a primary object of this invention to provide holographic apparatus which enables the construction of holograms having higher spatial frequencies in the image with a resultant improved resolution.

An important object of this invention is to provide novel holographic apparatus having a significant improvement in the level of radiant energy transmitted to an image reconstructed from the hologram.

A further object of this invention is to provide holographic apparatus in which larger effective numeric apertures and field sizes are possible over those with conventional arrangements.

An additional object of this invention is the provision of holographic apparatus in which the alignment of energy beam and hologram is simplified and efficient.

SUMMARY OF THE INVENTION

The foregoing objects are attained in accordance with the invention by using coherent radiation and a diffusion screen to illuminate an object for forming a holographic object beam and then providing either reflective surfaces, a highly refractive medium, or a combination of both along the object beam path to the recording emulsion, thereby redirecting and retrieving portions of the beam that would otherwise fail to impinge upon the recording emulsion. These redirected beam portions thus produce additional interference fringes at the recording surface, when coincident with a reference beam of radiant energy, increasing the information content.

In a preferred embodiment, a tunnel of reflective surfaces is provided between the object transparency and recording medium which is, in turn, attached to one end of the tunnel. The attachment maintains the proper alignment between the hologram and reflective surfaces, thus easing alignment problems for image reconstruction. The recording medium can be developed while still attached to the tunnel.

In an alternative embodiment of the invention, refraction is used to redirect the object beam portions. A transparent medium such as a glass block, having an index of refraction higher than the surrounding environment, is interposed between the object and recording medium. With the object spaced a small distance from the block, divergent rays which enter the block are, of course, bent toward the normal and thus redirected and stored in the recording medium. This results in higher spatial frequencies in the real image upon reconstruction. Again, the exposed photographic medium can be developed while still attached to the glass cube to minimize alignment time.

The invention has the advantage of conserving on the recording medium a significant increase in the amount of radiant energy emanating from the object. This control over the energy thus increases the number of energy rays reaching the recording medium and the number of interference fringes exposed therein. By reversing the direction of the reference beam after development of the recording medium and retaining the reflective light tunnel or refractive block, the same increase in energy is available during reconstruction of the image.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
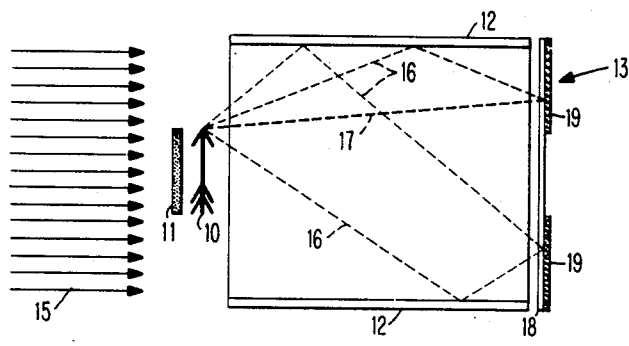
FIG. 1 is a schematic diagram of component arrangement for constructing a hologram with reflective surfaces in accordance with this invention.

Referring to FIG. 1, a hologram generating system according to this invention includes an object 10, illuminated by coherent light through diffusion screen 11, a recording medium 13 and a reflector 12 encompassing the object radiation path from the object to the recording medium. The object may be a conventional photographic transparency of art work such as a circuit diagram made by suitable reduction techniques. Illuminating coherent radiation for producing the necessary object and reference beams is indicated by arrows 15 and is preferably obtained from a laser, not shown, which produces the desired wavelength of energy. Since the original laser beam may be of insufficient diameter for particular circuit sizes, it can be enlarged by known techniques such as using a lens to focus the laser beam to a point for enlargement thereafter with a parabolic mirror, a telescope optical system, or a Cassegrainian optical system. In the figure, the radiation not falling on diffuser 11 or object transparency 10 forms the reference beam at the recording medium 13. The object beam is formed from that radiation striking diffuser 11 and passing therethrough to impinge on transparency 10.

Diffuser 11, which may be ground glass or some other medium that effectively scatters light with a minimum of absorption, scatters the light so that it impinges on the object in random directions enabling each point of the object to produce a diffraction pattern as it leaves the object transparency. The phase relationship of the object beam is randomized but constant. As will be noted from the figure, the original laser radiation represented by lines 15 becomes a hollow core of reference beam radiation, since only the scattered object rays are present in the geometrical shadow of the object. Thus, the single laser beam is now effectively divided into both reference and object beams to produce the required interference fringes at the recording medium. The holographic record will thus be formed about the perimeter of the object shadow and extend to the edges of the photographic recording medium 13.

Since the object radiation leaves the transparency 10 in random directions, some of the rays will not impinge on the recording emulsion. Therefore, reflector 12 is placed between the object and recording medium to redirect many of those rays toward recording surface 13 which would otherwise fail to impinge. The redirected rays each form additional interference fringes thus adding resolution information to the generated hologram. Such redirected rays are illustrated by sample rays 16. Directly impinging rays are represented as rays 17.

Reflector 12 can be readily formed by securing a plurality of plane mirrors together at their longitudinal edges to form a tunnel. It should be remembered that the reflective coating should be one which does not absorb the incident energy. The shape of the tunnel is a function of the resolution and image area desired and may be of various configurations such as square, round, triangular, etc. Whatever configuration used for the hologram construction, of course, is used for the image reconstruction also.

The recording medium 13 may comprise a transparent glass substrate 18 which is covered with a photosensitive emulsion 19 that is responsive to the wavelength of the source illumination 15. If the hologram is to be used to expose photoresist eventually, then the shorter wavelengths in the ultraviolet range are usually desirable. Commercial photoresists generally require wavelengths between 2,500 and 5,000 angstroms for activation.

Figure 2:
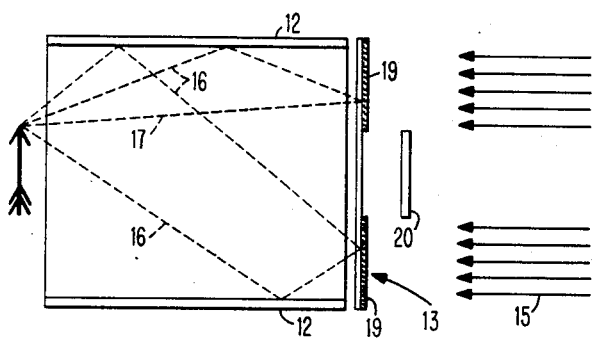
FIG. 2 is a schematic diagram of component arrangement for reconstructing an image from a hologram made in accordance with the arrangement of FIG. 1.

Image reconstruction from the hologram made with the reflective tunnel is illustrated in FIG. 2. For reconstruction, the direction of the radiation source 15 is oriented to pass through the hologram in the direction opposite to that used for generation. In addition, a baffle 20 is aligned to block the zero order radiation from that portion of the hologram which was originally in the geometric shadow of the object transparency. With developed hologram 13 and reflector 12 properly aligned, the real image is reconstructed in the original object location.

Figure 3A:
FIGS. 3a and 3b are comparative photocopies of images reconstructed from a conventional hologram and a hologram made in accordance with the technique illustrated in FIGS. 1 and 2.
Figure 3B:
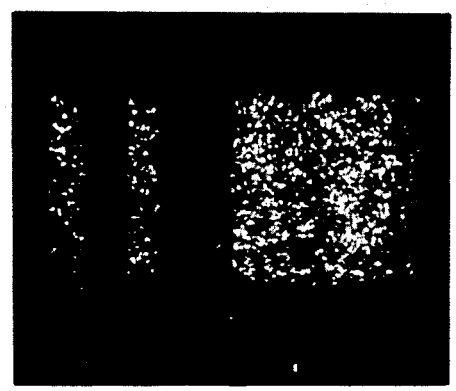

The change brought about by the reflector produces a significant improvement in resolution and intensity over the conventional method of omitting redirection of nonimpinging light rays. A comparison of the two methods is shown in FIGS. 3a and 3b in which FIG. 3a is a photograph of a magnified image without the reflector, and FIG. 3b is that image resulting when the reflector is added. Note that the speckle size is reduced, thus improving edge definition. The improvement in intensity, also apparent from the photograph, is significant since FIG. 3b was exposed in half the time required for FIG. 3a.

Figure 4:
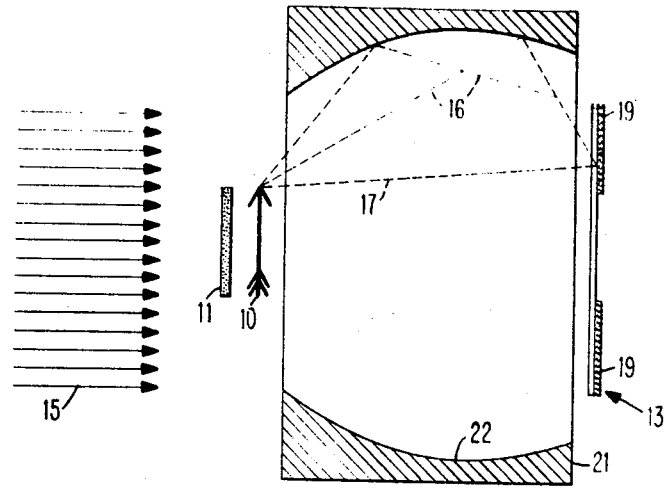
FIG. 4 is a schematic diagram of the component arrangement as shown in FIG. 1 but with a modification of the reflective surfaces to further improve the radiation collection efficiency.

In order to provide a more efficient redirection of nonimpinging radiant energy, the reflector may be modified as illustrated in FIG. 4. Reflector 21 has its reflecting surface 22 generated to maximize the useful ray recovery and further enhance the resolution and energy transmission efficiency. Reflector 21 may be made of any suitable material and covered with a reflective coating appropriate for the radiation wavelength to be used. The use of an appropriately curved surface 22 will permit decreasing the angle between interfering object and reference rays and result in a hologram of lower spatial frequencies but capable of projecting high spatial frequencies. As a consequence, less expensive and faster emulsions may be used for recording the hologram.

Figure 5:
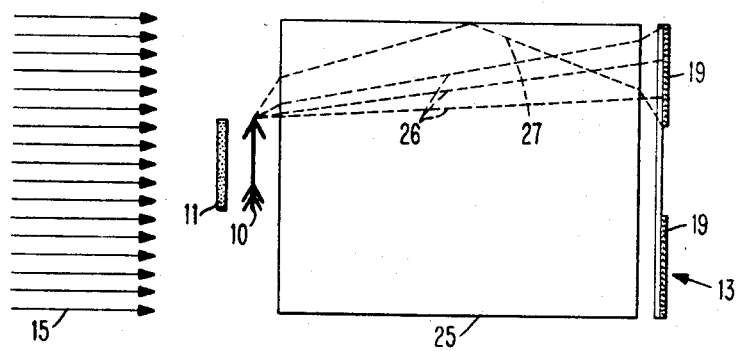
FIG. 5 is a schematic diagram of component arrangement for constructing a hologram similar to FIG. 1 but modified by the substitution of a highly refractive medium for the reflective surfaces.

As an alternative to providing a reflective surface surrounding the object beam path, a medium of relatively high refractive index may be placed between the object transparency 10 and recording medium 13 as shown in FIG. 5. In this embodiment, a glass block 25 is substituted for the reflector and serves nearly the same function. Object beam rays leaving transparency 10 enter glass block 25 at varying angles and, according to Snell's law, are redirected toward the normal as indicated by exemplary rays 26. The object transparency and recording medium are preferably spaced a small distance of 0.010–0.020 inches from the glass block to permit refraction. This redirection thus increases the number of rays eventually reaching the recording medium so that the resolution and intensity are both improved. As with the reflector, recording medium 13 is preferably not used in the area of the geometrical shadow of the object transparency. It will also be noted that the recording emulsion may, if desired, be placed directly on the glass, eliminating the need for the substrate.

When the glass block is used in a surrounding medium of less density, such as air, there is an additional contribution to the resolution and intensity by the total internal reflection occurring at the glass-air interface along the surfaces enclosing the object beam rays. Rays 27 are those reflected. As described above, the glass block surfaces encompassing the object beam can be modified in shape to optimize the reflective component of the object beam, if desired.

Image reconstruction is accomplished in the same manner as illustrated in FIG. 2, and the coherent source radiation is directed through the developed hologram in the opposite direction to produce a real image at the location of the original object transparency. When this method of reconstruction is used, imperfections within the glass block are of little consequence because the hologram rays retrace the same routes originally taken as an object beam thereby negating aberrations that may have been caused by the glass.

When either the reflective tunnel or glass block is used, it is preferred that the radiation entry surface or area and hologram surface be approximately several times the diameter of the object transparency. This allows the reference beam to entirely surround the object and to produce interference fringes from a larger proportion of the object radiation. The alignment of recording medium and tunnel or glass block can be aided by selectively securing the photographic substrate to the tunnel or block at a few points with an adhesive to maintain the substrate and redirecting means as a single unit during exposure, development and reconstruction. In addition, since a spacing of a few thousandths of an inch is desirable between the recording medium and light redirecting means, the emulsion on the photographic substrate can be placed on either side of the substrate. Of course, when facing the glass block, the development process is slowed due to the difficulty in getting the developing liquid onto all parts of the exposed hologram.

While the invention has been particularly shown and described with reference to preferred embodiments thereof, it will be understood by those skilled in the art that the foregoing and other changes in form or details may be made therein without departing from the spirit and scope of the invention.

What is claimed is:

1. Optical apparatus for constructing holograms of an object comprising:
    means for recording the impingement of incident radiation;
    means for directing a beam of radiation at said object to produce information-bearing rays of said object, certain of said rays propogating in a direction of incidence on said recording means and others of said rays propogating in a direction away from said recording means;
    means for directing a beam of reference radiation at said recording means having coherence with said object radiation for forming an interference pattern in conjunction with said incident information-bearing rays, said reference radiation being substantially parallel with said beam directed at said object; and
    means interposed between said object and said recording means for redirecting at least a portion of said others of said information-bearing rays toward said recording means for interference thereat with said reference beam, said redirecting means including a reflective member entirely surrounding said reference beam in planes normal to the direction of propogation of said reference beam and surrounding said information-bearing rays passing beyond said object.

2. Apparatus as described in claim 1 further; including radiation diffusing means interposed between said object and the source of said radiation to randomly disperse the radiation prior to impingement on said object; and
    wherein said reflective member also redirects at least a portion of said others of said information-bearing rays by refraction.

3. Apparatus as described in claim 1 wherein said recording means is attached to said member for establishing a fixed relationship therewith.

4. Apparatus as described in claim 1 wherein said reflective surface of said member is curved to optimize the quantity of radiation redirected to said recording means.

5. Apparatus as described in claim 1 wherein said redirecting means includes a member of homogenous material operable to redirect said nonimpinging information-bearing rays by both reflection and refraction.

6. The method of constructing one or more images of an object comprising the steps of:
    directing a beam of radiant energy through a diffuser onto an object to produce information-bearing rays of said radiant energy proceeding in random directions;
    positioning a recording medium sensitive to said radiant energy in the path of a portion of said information-bearing rays for impingement thereby;
    directing reference radiation having coherence with said information-bearing rays for impingement therewith on said recording medium to produce a pattern with said reference beam being substantially parallel with said radiation directed at said diffuser;
    redirecting certain of said information-bearing rays for impingement on said medium which would otherwise not impinge, said redirection being done by encompassing said certain rays as a group with a reflective surface which also entirely surrounds said reference radiation in planes normal to the direction of propogation of said reference radiation, and
    illuminating said pattern of interference fringes with a beam of said reference radiation to holographically reconstruct an image of said object.

7. The method as described in claim 6 wherein said redirection of said certain rays is done by a combination of reflection and refraction.

* * * * *